Oct. 29, 1963 V. NAVARA 3,108,614
CONTROL VALVE FOR METAL SPRAYING GUNS
Filed June 23, 1960 2 Sheets-Sheet 1
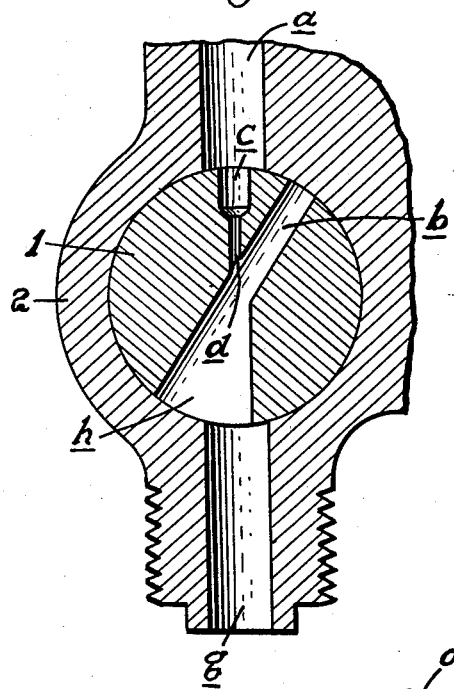
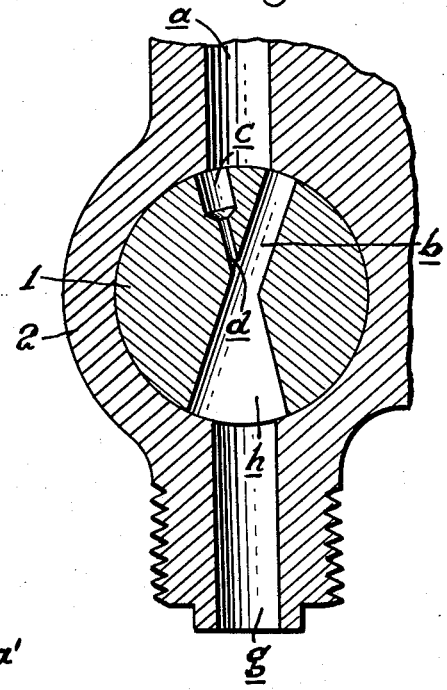
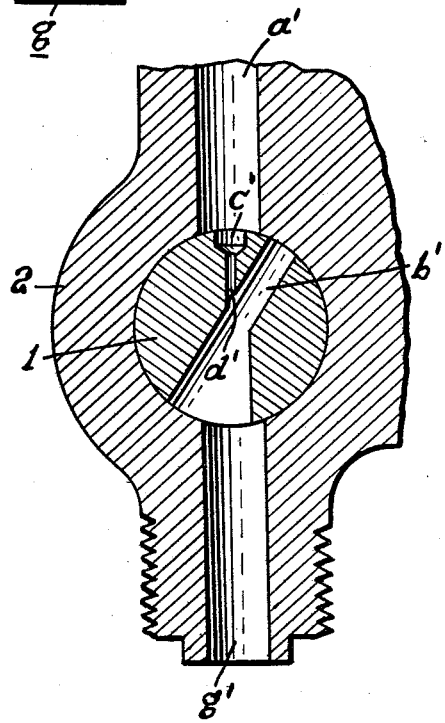
INVENTOR.
Václav Navara Oct. 29, 1963 V. NAVARA 3,108,614
CONTROL VALVE FOR METAL SPRAYING GUNS
Filed June 23, 1960 2 Sheets-Sheet 2

INVENTOR.
Václav Navara
BY 3,108,614
CONTROL VALVE FOR METAL
SPRAYING GUNS
Václav Navara, Ledec upon Sazawa, Czechoslovakia, assignor to Kovo-Finis, narodni podnik, Ledec upon Sazawa, Czechoslovakia
Filed June 23, 1960, Ser. No. 38,335
4 Claims. (Cl. 137—625.16)

The present invention relates to metal spraying guns, and more particularly to improvements in a control valve for controlling the flow of the several fluids employed in operation of a metal spraying gun. This is a continuation-in-part of my co-pending applicaiton Serial Number 773,728, filed on November 13, 1958, and now abandoned.

In a metal spraying gun for which the control valve of the invention is intended, a flame is produced from a combustible fluid, such as acetylene, and a combustion supporting fluid, such as oxygen. Metal is fed to the flame in the form of a wire or powder, and is fused in the flame. The molten metallic material is atomized and projected toward an article which is to be metallized by means of a stream of propellant fluid under pressure, for example, compressed air.

Valves for controlling the several operating fluids in metal spraying equipment usually have a single movable valve member formed with a plurality of passages for the respective fluids, or separate valves are provided for each fluid, and are mechanically interconnected for joint movement.

In the typical case of a gun employing oxygen, acetylene, and air, the gun is started with acetylene and oxygen only. No air is employed, and the oxygen supply is at first throttled to provide a flammable mixture rich in acetylene which will produce a reducing flame. If this precaution is not taken, the flame is blown out.

In a known valve arrangement with multiple fluid passages for the several fluids, provisions have been made to permit variation of the gas mixture as required for starting. The known valve has a body with a bore in which a plug is rotatable about an axis. Transverse passages in the plug of the valve can be brought into alignment with the orifices of corresponding passages in the valve body by rotation of the plug. The contact surface of the plug is formed with narrow throttling slots which extend from the orifice of a passage in the direction of rotation so that an initial mixture of fluids can be supplied by the valve in which one or several constituents are provided through the throttling passage of a slot in reduced amounts. The slots are formed by filing or similar machining operations on the curved plug surface.

Because of the location of the slots, they cannot be produced very precisely. It has been found necessary to make adjustments by trial and error. Because the slots are open opposite the internal surface of the valve body, and are of necessarily small depth, they tend to accumulate some of the lubricant employed as a sealant and in order to facilitate relative movement of the valve body and of the plug. Even small amounts of lubricant substantially alter the flow resistance of a surface slot of the type described, and thus the rate of gas supply. Ignition can become difficult or impossible, and even damage to the gun may result from an improper mixing ratio of the flame constituents.

Valves of the known type described must be cleaned frequently. When the plug of the valve is re-ground to overcome the effect of wear, the depth of the slots is changed, and they must be re-cut.

When produced by the shaping operations which are most practical, the slots of the known plug slope inward from the level of the plug surface in a direction toward the related passage. Impurities carried by the gas tend to be trapped in the wedge shaped slot cavity and to be pressed with substantial force into the internal valve body face during rotation of the plug, thus hastening valve wear and impairing valve tightness. Any leakage along the plug may lead to accidents if the combustible gas and combustion supporting gas are permitting to mix in explosive proportions.

It is an object of the present invention to provide a control valve for a metal spraying gun which precisely meters the several fluids during an ignition period for best ignition conditions.

Another object is the provision of such a valve which is capable of operating over an extended period without the need for cleaning or other maintenance operations.

Yet another object is the provision of a control valve which permits rapid switching from ignition conditions to full operating conditions, and which produces a clean, smokeless, stable flame.

A further object of the invention is the provision of a control valve which is inherently safe against accidental leakage of any appreciable amount of combustible fluid into the combustion supporting fluid conduit and vice versa.

With these and other objects in view, the invention provides a valve for the control of fluids in a metal spraying gun of the type described, the valve consisting essentially of a valve body and a plug. The valve body has a bore of substantially circular cross section and is equipped with separate inlet and outlet ports for two fluids, more specifically for oxygen and for a combustible gas. The ports communicate with the bore of the valve body in which the mating plug is rotatably mounted. The plug is formed with two radially elongated main ducts and two radially elongated auxiliary ducts which are arranged in such a manner that either the two main ducts or the two auxiliary ducts may be aligned with respective inlet and outlet ports of the valve body by rotation of the plug about its axis. In this manner the two fluids may pass simultaneously but separately from the respective inlet to the respective outlet port either through the main ducts or the auxiliary ducts depending on the rotary position of the plug.

Each auxiliary duct has a metering portion which is spaced from the valve body and has a smaller flow section that the orifice portion of the auxiliary duct which is adjacent the valve body. The metering portions of the auxiliary ducts have flow sections one of which amounts to substantially one-third to one-fifth of the flow section of the other.

Where the two fluids are oxygen and a combustible gas, the metering portion of the auxiliary oxygen duct is so dimensioned as to pass oxygen at a rate which is one-fifth to one-eighth of the rate of passage through the corresponding main duct. The metering portion of the auxiliary combustible gas duct passes the gas at a rate which is between one-quarter and two-fifths of the rate of passage through the main combustible gas duct.

To avoid accidental leakage of one of the gases into the other, axial portions of the valve body and of the plug axially intermediate the alignable orifices of the two sets of ports and ducts jointly define an annular chamber which is vented to harmlessly release any leaking gas to the outside.

Other features and many of the attendant advantages of this invention will be readily appreciated as the same becomes better understood by reference to the following detailed description when considered in connection with the accompanying drawings in which like reference characters designate like parts throughout the figures thereof, and wherein:

FIG. 1 is a fragmentary cross sectional view of a preferred embodiment of the control valve of the invention, the section being taken in a plane through the intake and outlet ports for one of the fluids on the line 1—1 of FIG. 3, the plug being positioned for ignition;

FIG. 2 shows the device of FIG. 1 with the plug positioned intermediate the ignition position and the normal operating position;

FIG. 5 is a cross sectional view similar to that of FIG. 1, but taken on the line 5—5 of FIG. 3.

Figure 3:
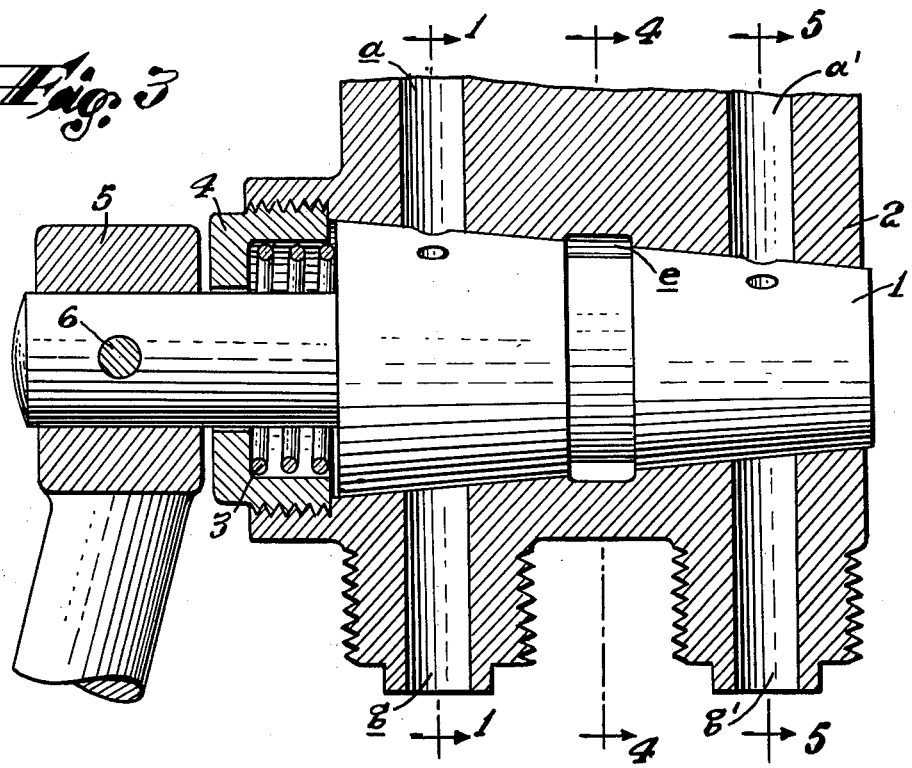
FIG. 3 shows the valve of FIG. 1 in fragmentary axial section on the line 3—3 of FIG. 4.

Referring now to the drawings, and initially to FIG. 3, there is seen a conically tapering plug 1 which is rotatably mounted in a conforming bore of a valve body 2. The plug 1 is secured in its proper axial position by a helical compression spring 3 the ends of which abut against a transverse face of the plug 1 and against a valve cover 4. The plug is actuated by a handle 5 which is fastened to the plug 1 by a pin 6.

FIGS. 1 and 2 illustrate the conduits for passage of oxygen through the valve. Oxygen is admitted through an inlet port $a$ in the valve body which may be brought into communication with a main duct $b$ or an auxiliary duct in the plug 1 by rotation of the latter. The orifice portion $c$ of the auxiliary duct is of approximately the same cross sectional area as the corresponding main duct $b$. It communicates with the main duct by a metering portion $d$ the flow section of which is very substantially smaller than that of the main duct $b$. A discharge duct $h$ which radially flares in an outward direction approximately from the axis of the plug connects the ducts $b$ and $c$ with a relatively wide orifice in the conical surface of the plug which can be aligned with a discharge port $g$ in the valve body when either the main duct $b$ or the auxiliary duct orifice $c$ are in communication with the inlet port $a$.

When the plug is in the ignition position illustrated in FIG. 1, the passage of oxygen from a storage tank (not shown) to the metal spraying gun (not shown) is metered by the portion $d$ of the auxiliary duct. Turning of the plug provides an intermediate position illustrated in FIG. 2 in which both the auxiliary and the main oxygen duct are at least partly available, until finally the axis of the main duct is aligned with the common axis of the inlet port $a$ and the outlet port $g$ in the normal operating position (not shown) for free passage of oxygen.

Passage of acetylene through the valve is controlled in the same manner by the cooperating inlet and outlet ports $a'$ and $g'$, the main duct $b'$, and an auxiliary duct which has an orifice portion $c'$ and a metering portion $d'$ (see FIG. 5). The corresponding duct elements for passage of oxygen and acetylene are angularly aligned about the axis of the plug as best seen from FIG. 3 for simultaneous control of both gases in a similar manner. The structures illustrated in FIGS. 1 and 5 differ in the diameters of the respective metering portions $d$ and $d'$. The cross sectional area of the auxiliary duct portion $d'$ for the passage of acetylene is three to five times greater than the cross sectional area of the corresponding duct portion $d$ for the passage of oxygen during the ignition stage of gun operation. This arrangement ensures a stable and smokeless flame during ignition.

In the embodiment of the invention illustrated, the diameter of the port $a$ is the same as that of the port $a'$. The diameters of the ducts $b$ and $b'$ are also equal. The plug diameter however is greater in the transverse plane through line 1—1 than in the corresponding plane through line 5—5 (see FIG. 3). Because of this difference, the duct $b'$ is opened slightly earlier to the passage of acetylene than the duct $b$ is opened to the passage of oxygen. This slight lead in acetylene supply is important for proper operation of the gun after ignition.

The amount of oxygen and acetylene fed to the gun during the ignition period is controlled by the metering portions $d$ and $d'$ respectively at a constant rate until the bore $b'$ begins to register with the corresponding port $a'$. It is necessary that the flame produced during the ignition period be of proper size relative to the flame obtained under full operating conditions, and the flow sections of the metering portions must be chosen accordingly. Satisfactory operation of the valve of the invention when operating with oxygen and acetylene, and with many other combustible gases, is achieved when the metering duct portion $d$ passes one-fifth to one-eighth of the amount of oxygen which would pass through the corresponding main duct $b$ under otherwise similar conditions including equal pressure in the inlet port $a$, and when the auxiliary port $d'$ similarily passes between two-fifths and one-quarter of the amount of acetylene which is passed by the main duct $b'$.

Figure 4:
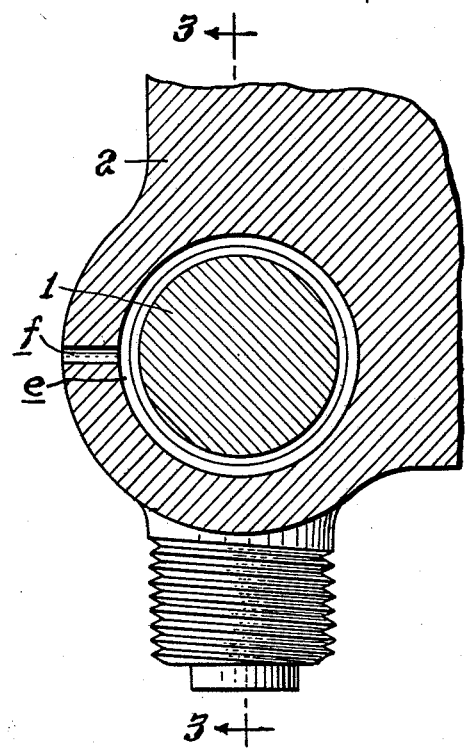
FIG. 4 is a cross sectional view of the device of FIG. 3, the section being taken on the line 4—4 of FIG. 3.

To prevent leakage of oxygen into the combustible gas lines, and vice-versa, an axial portion of the circumference of the plug 1 intermediate the sets of ducts for the two gases is formed with an annular groove $e$ which is vented to the atmosphere by a radial bore $f$ in the valve body 2 as seen from FIGS. 3 and 4. Oxygen or acetylene which may leak into the contact space between the plug 1 and the valve body 2 is collected in the groove $e$ and harmlessly released through the bore $f$. A gas pressure sufficient to drive one gas into the normal path of the other gas in the valve can never develop. Even if the valve loses its tightness with prolonged use, an explosive mixture of oxygen and acetylene cannot be formed accidentally.

The valve of the invention provides precisely metered amounts of a combustible and of a combustion supporting gas during the ignition period of a metal spraying gun. The precision of the metering effect is maintained over extended periods without the need for cleaning or other maintenance operations. The specific arrangement illustrated creates optimum conditions for ignition, and for proper transition from ignition to full operating conditions without requiring any special skill of an operator. The valve is safe from the hazards of accidental contamination of one of the gases by the other, and the resulting formation of an explosive mixture.

It will be understood that the valve illustrated may be provided with additional ports and ducts for control of the propelling gas, which is usually compressed air, but the advantages to be gained from such an arrangement are entirely secondary to those available from the described control arrangement for the flow of the combustible and the combustion supporting fluid.

It should of course be understood that the foregoing disclosure relates to only a preferred embodiment of the invention and that numerous modifications or alterations may be made without departing from the spirit and the scope of the invention as set forth in the appended claims.

What is claimed is:

1. A control valve arrangement for a metal spraying gun and the like, comprising, in combination, a valve body formed with two inlet ports and two outlet ports, one of said inlet ports being adapted to be connected to a source of combustible gas and a source of combustion supporting gas, respectively, each of said inlet ports forming a pair of ports with a corresponding outlet port, said valve body being formed with a bore of circular cross section, said ports having orifices in said bore; and a valve plug mating said bore, said plug being formed with two main ducts and two auxiliary ducts therethrough and rotatable in said bore about an axis between a first position in which said main ducts are aligned with said orifices to respectively connect said pairs of ports, and a second position in which said auxiliary ducts are aligned with said orifices to respectively connect said pairs of ports; respective ones of said main and auxiliary ducts constituting corresponding first ducts for alternative passage of combustible gas therethrough to a first one of said outlet ports, and the other ducts constituting second corresponding ducts for alternative passage of combustion supporting gas therethrough to the second outlet port; each of said auxiliary ducts having a metering portion of a flow section substantially smaller than the flow section of the corresponding main duct, the flow section of the metering portion of said first auxiliary duct being substantially smaller than the flow section of the metering portion of said second auxiliary duct, said ducts having respective radially extending axes, the axes of said main ducts and of said auxiliary ducts extending in respective common axial planes, and the axes of said corresponding first and second ducts extending in respective first and second radial planes axially spaced from each other, said plug having a smaller diameter in said first radial plane than in said second radial plane, the orifices of two respective ports of said pairs of ports having substantially the same circumferential dimensions, said main ducts forming apertures in said plug, said apertures being aligned with said last mentioned two ports respectively in said first position of said plug, and out of alignment in said second position of said plug, the circumferential dimensions of said apertures being substantially equal, whereby during rotation of said plug from said second toward said first position thereof said first main duct is adapted to conduct combustible gas to said first outlet before the second main duct is adapted to conduct combustion supporting gas to said second outlet.

2. An arrangement as set forth in claim 1, wherein the flow sections of said main ducts are substantially equal, and the flow section of the metering portion of said first auxiliary duct is approximately one third to one fifth of the flow section of the metering portion of said second auxiliary duct.

3. An arrangement as set forth in claim 1, wherein each of said auxiliary ducts has an orifice portion of substantially greater flow section than the respective metering portion, said orifice portion directly communicating with a respective port when said valve plug is in said second position thereof.

4. An arrangement as set forth in claim 1, wherein said two ports are said inlet ports.

References Cited in the file of this patent

UNITED STATES PATENTS

| | | |
|---|---|---|
| 926,774 | Schmidt | July 6, 1909 |
| 955,611 | Stevens | Apr. 19, 1910 |
| 2,164,295 | Mott | June 27, 1939 |
| 2,889,852 | Dunlap | June 9, 1959 |

FOREIGN PATENTS

| | | |
|---|---|---|
| 339,396 | Germany | July 23, 1921 |
| 791,131 | France | Sept. 23, 1935 |